Dec. 5, 1933.  A. H. CANDEE ET AL  1,937,628
METHOD OF AND MACHINE FOR PRODUCING GEARS
Filed Oct. 1, 1931   3 Sheets-Sheet 3
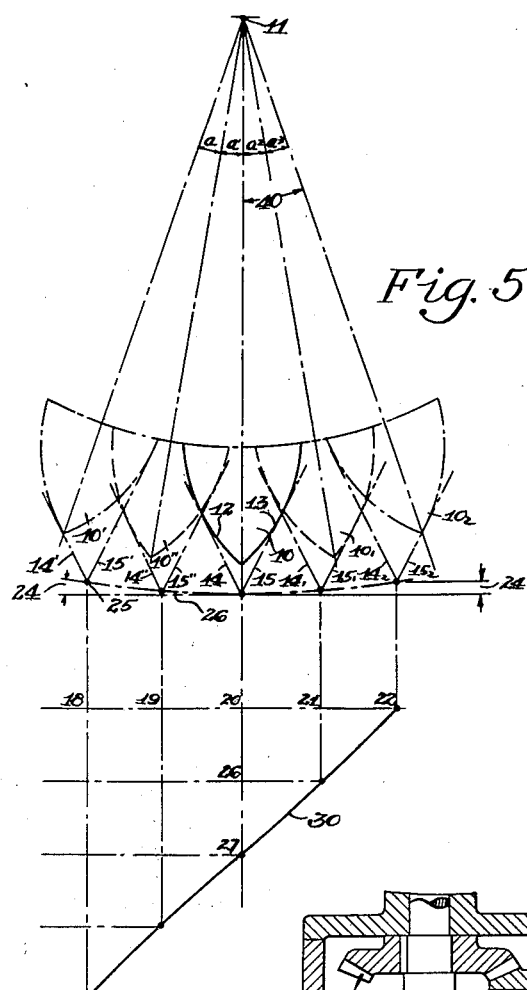
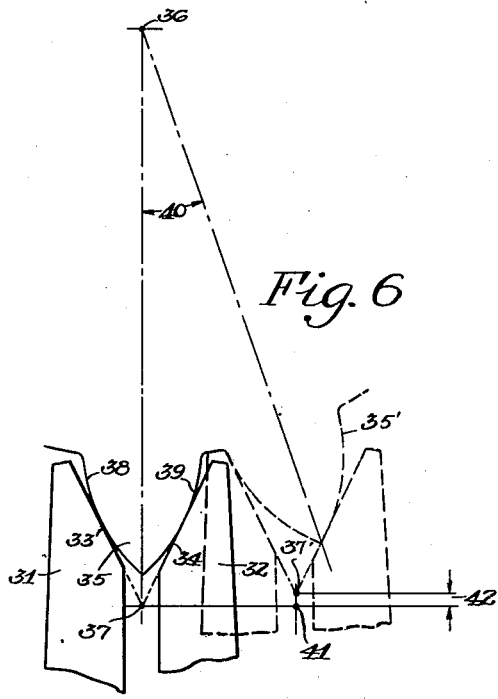
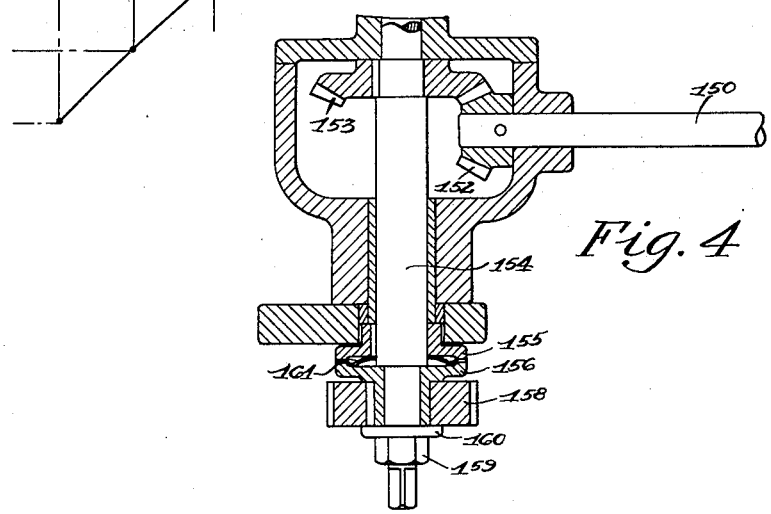
INVENTORS
Allan H. Candee
BY Leonard O. Carlsen
their ATTORNEY Patented Dec. 5, 1933

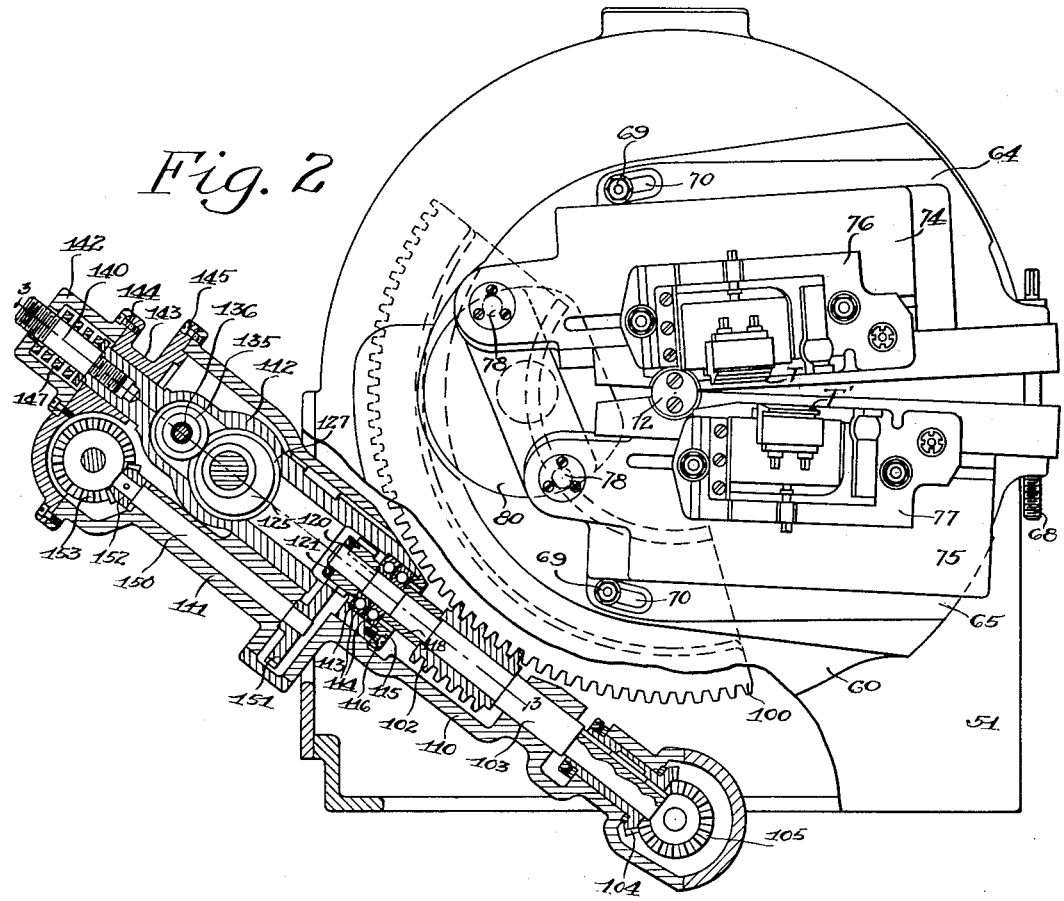

1,937,628

UNITED STATES PATENT OFFICE 1,937,628

METHOD OF AND MACHINE FOR PRODUCING GEARS

Allan H. Candee and Leonard O. Carlsen, Rochester, N. Y., assignors to Gleason Works, Rochester, N. Y., a corporation of New York Application October 1, 1931. Serial No. 566,366

23 Claims. (Cl. 90—9)

The present invention relates to a method of and machine for producing gears.

In the art of gearing, the involute is today the standard tooth shape and gear cutting machines generally are built to generate teeth having involute tooth profiles. However, from time to time, suggestions for the use of other tooth shapes are advanced, most frequently where it is sought to attain a particular object for which the involute shape is not especially suited. For instance, for the purpose of obtaining greater quietness, it has been suggested that the height of teeth of the gears be increased to a considerable degree so as to make the teeth more flexible and that in order to retain the requisite strength the sub-base portions of such teeth be formed along parabolic curves. Again, in order to maintain traction under all conditions, it has been proposed that the gears used in the differentials of motor vehicles be provided with tooth shapes calculated to produce a variable leverage when running in mesh and to obtain such variable leverage it has been suggested that tooth profiles be used which are of circular arc curvature. As a further example, gears having stepped tooth profiles have been advanced as a means of attaining increased tooth strength.

These and other types of gearing employing non-standard tooth shapes, and many more could be mentioned, have heretofore had to be cut in a forming operation or, if they could be generated, they could only be generated by use of tools of very special shape, tools which are difficult to make and quite expensive.

It is well known that the generating process produces quieter and more accurate gears than a forming process. The purpose of the present invention is two-fold, first, to make possible the generation of gears of non-involute profile shape which it has heretofore been possible to produce only by a form-cutting process, and, second, to simplify the generation of such of these non-standard gears, as it has been possible heretofore to generate, by making it practical to cut them with standard straight-sided generating tools.

The present invention is particularly applicable to the cutting of straight toothed spur and bevel gears, but in a broad sense this invention may be employed also in the generation of spiral bevel or longitudinally curved tooth tapered gears. The present invention is based upon the idea of varying the relative ratio of tool and blank motions during generation of the tooth profiles, thereby to roll out the desired tooth profile shapes.

In the cutting of spiral bevel gears with teeth of tapering depth, so-called "bias bearing" will ordinarily be obtained. This is a tooth surface contact which extends diagonally across the tooth surfaces of mating gears. It is the result of the cutting action of the tool, for as the tool and blank roll together, the tool takes successive cuts along lines lying obliquely on the tooth surface and successive lines of cut proceed from one corner of the tooth surface to the diagonally opposite corner. It is objectionable in many drives and various expedients have been suggested for eliminating it. In practice, the method most used is that of cutting the pinion of a pair slightly out of true running position. It is possible to wholly control this bearing condition and to eliminate it entirely, if desired, in a much simpler manner with the present invention, by varying the roll between the tool and blank so that additional metal is removed from diagonally opposite corners of the teeth and left on on the other corners, that is, the pressure angle of the teeth of one or both members of the pair is modified just enough at different points along the length of the teeth to neutralize the tendency to bias and to produce a profile bearing which, when a pair are in mesh, will parallel the pitch lines.

The principal objects of the invention have been described above, but other objects of the invention will be apparent hereinafter from the specification and from the recital of the appended claims.

In the drawings:

Figure 2 is an elevational view of the tool end of this machine, parts being broken away to show the mechanism for oscillating the cradle;

Figure 3 is a section on the line 3—3 of Figure 2;

Figure 4 is a fragmentary sectional view, showing further details of the cradle drive; and Figures 5 and 6 are diagrammatic views illustrative of the method of generating gears according to the present invention.

Figure 1:
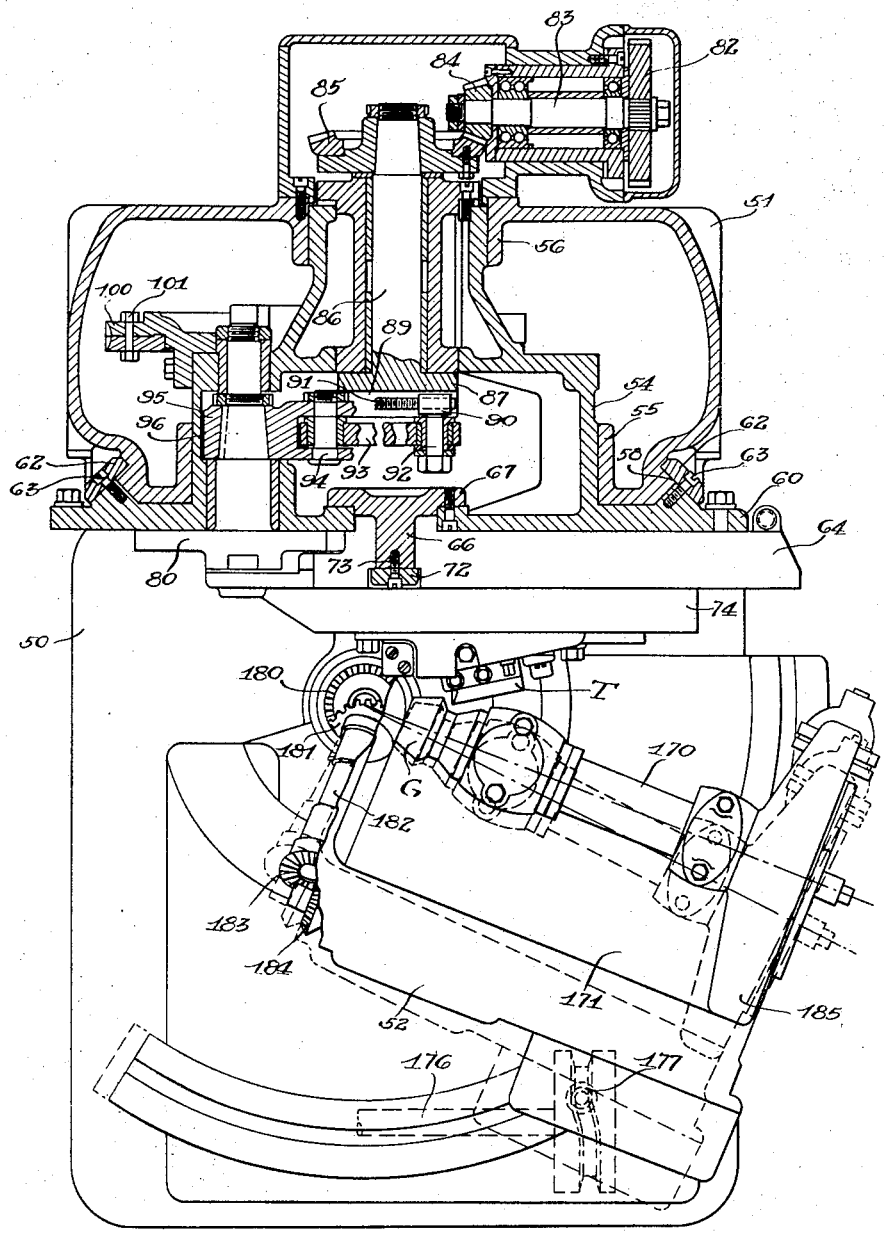
Figure 1 is a view partly in plan and partly in section of a standard straight tooth bevel gear generator, as modified to cut, according to the present invention, bevel gears having teeth of non-involute profile shape.

In ordinary spur and bevel gear generating machines, the generating motion is produced by rotating the blank on its axis at a uniform velocity and by simultaneously producing a relative movement of translation between the tool and blank at a uniform velocity. For spur gears, this movement of translation is along the plane of the basic rack represented by the tool, while for bevel gears, this movement of translation is about an axis representing the axis of the crown gear or other gear to which the gear being cut is to be generated conjugate. In either case, the center distance or distance between the blank axis and the plane of cut is maintained constant during generation. The tool or blank is first fed into depth and then the feed is discontinued during actual generation.

With the present invention, as before, the generating roll is produced by rotation of the blank on its axis and by a simultaneous movement of translation between the tool and blank which may be rectilinear or angular depending upon the type of gear to be produced and the method used in producing the same. With the present invention, however, one of these motions will take place at a varying velocity. In addition, the present invention contemplates that the center distance between the blank axis and the plane of cut may, if desired, be varied during generation of the tooth profiles. In the preferred method of practising the invention, the blank is rotated at a uniform velocity whereas the movement of translation is at a varying velocity. The change in center distance may or may not be employed depending upon the particular tooth shape to be produced. Through the combination of these motions, gears of widely different tooth shapes can be generated and generated, too, while using standard straight-edged tools.

The present invention may be practised on various types of machines. In the drawings, we have illustrated how the two-tool bevel gear generator covered by U. S. Patent No. 1,656,633 issued January 17, 1928 may be modified so that it can be employed to generate gears of non-involute tooth shape according to the present invention. In this machine, a pair of reciprocating tools are employed to cut simultaneously opposite side tooth surfaces of the blank. These tools are straight-sided, representing tooth surfaces of a basic crown gear and the tools are moved in converging paths to cut tapering teeth on the blank. The blank is fed into depth by operation of a feed cam. The blank is rotated on its axis and the tools are simultaneously swung by movement of a cradle, about an axis representing the axis of the basic generating gear to generate the tooth profiles. After each tooth has been cut, the blank is indexed. The rotation of the cradle is produced by a train of gearing including a worm wheel which is secured to the cradle and a worm which actuates the same.

For the purposes of the present invention, this machine may be modified in various ways. As shown in the drawings, means may be provided for reciprocating the cradle worm simultaneously with its rotation so as to impart to the worm in addition to its usual rotation at a uniform velocity, a reciprocatory movement at a varying velocity, thereby to rotate the cradle at a varying velocity. In addition, if the type of tooth shape to be produced requires it, a cam may be substituted for the usual feed cam of the machine, which will impart a continuous relative feed movement between tools and work during generation and will thereby operate to continuously change the center distance of the machine or the angle between the blank axis and the plane of cut.

We shall refer first to Figures 5 and 6 of the drawings, wherein is illustrated the preferred method of producing straight tooth spur and bevel gears according to the present invention. As stated, one of the prime advantages of involute gears, aside from their adjustability, is that they may be generated with straight-sided tools. Such tools are comparatively simple to make and sharpen and straight-sided cutting tools, especially, are simple and inexpensive. With this invention, gears of a wide variety of different profile shapes may be cut, but despite the irregularity of the various profiles which can be generated, one of the features of the invention is that straight-sided tools can still be employed on all jobs.

In Figure 5, 10 indicates a tooth of a gear which rotates about an axis 11. The profiles 12 and 13 of opposite sides of the tooth 10 are of non-involute shape, specifically circular arcs. With the present invention, it is not necessary to employ a form-cutting tool to shape the profiles 12 and 13, but these may be generated with straight-sided tools indicated diagrammatically at 14 and 15. In the generation of the tooth profiles 12 and 13, the gear is given a rotary motion about its axis 11 and simultaneously a relative movement of translation is produced between the tools and the blank. In the drawings, this movement is illustrated as imparted to the tools. $10'$, $10''$, $10$, $10_1$ and $10_2$ designate successive positions of the gear tooth as it rolls about the axis 11 during the generation of the profiles 12 and 13. $14'$, $14''$, $14$, $14_1$ and $14_2$ and $15'$, $15''$, $15$, $15_1$ and $15_2$ designate, respectively, corresponding positions which the two tools occupy during the generating roll.

It has been assumed that the blank is rotating at a uniform velocity about its axis 11 during generation. Thus the angular distances $a$, $a'$, $a''$, and $a'''$ are equal. It is seen that in order to generate the desired profiles 12 and 13 on the gear tooth 10, the tools 14 and 15 must be translated at a varying velocity during the uniform rotation of the blank. Thus the distance 18—19 between two successive positions of the tools is less than the distance 19—20 between the next two succeeding positions of the tool.

It will be seen, also, that in order to maintain the tools in operative contact with the tooth profiles, the center distance between tools and blank, or the distance between the center of the blank and the plane of cut must be varied during the generating roll. Thus, as the tools are translated from 20 to 22, they are moved inwardly, that is, toward the blank axis, a distance indicated at 24. The point 25 of convergence of the sides of the tools moves, then, on the curved path 26.

In Figure 5, we have illustrated the generation of a tooth which is of symmetrical shape. For the generation of such a tooth, the two tools have, as shown, symmetrical movements to either side of center during the generating roll. Thus the distance 20—21 of translation of the tools during the time the blank rotates one side of center through the arc $a''$ is equal to the distance 19—20 of translation of the tools during the time the blank rotates through the symmetrical arc $a'$, the other side of center, and in like manner, the distances 21—22 and 18—19 are equal. Likewise, the distances 24 of the inward movement of the tool as the blank rotates from center to either end of the roll are equal. For an unsymmetrical tooth, the amount of translatory movement of the tool at symmetrical parts of the roll might be different either side of the center or the amount of feed might be different either side of center, or these two variations might be combined. It will be seen, further, that as the rate of translation of the tools during rotation of the blank can be varied at will, through the combination of motions possible with the present invention, profiles departing to a considerable degree from the usual involute can be generated and generated, too, with straight-sided tools.

In Figure 5, the curve of relative positions of tool and blank resulting from the combination of motions employed in generating the tooth 10 is plotted on a system of coordinates. As the rotation of the blank is uniform, the ordinates 27—20, 27—28 etc. are equal, but as the translation of tools is at a varying velocity, the abscissæ 18—19, 19—20 etc. are unequal. The line 30 is the curve of relative positions of tool and blank. For the generation of a gear of involute tooth profile, this line would be a straight line.

Gears can be cut with this invention with straight profiled tools of any type. Thus straight profiled grinding wheels or milling cutters of either the conical or planular types may be employed as well as the planing tools ordinarily used in spur and bevel gear generators.

Figure 6 shows the operation when a pair of planing tools or conical cutters or grinding wheels are employed. 31 and 32 designate the cutting or grinding tools. These have, respectively, straight cutting edges or grinding profiles 33 and 34. The tools are positioned to cut opposite sides of the tooth 35 of a gear which rotates about the axis 36 and the sides of the tool converge in a point 37.

To generate the tooth 35, the tools 31 and 32 are moved, for instance, reciprocated, across the face of the gear blank and simultaneously the blank is rotated on its axis and a relative movement of translation is produced between the tools and blank. For producing the lengthwise tooth shape, the tools move along lines perpendicular to the plane of the drawing or along lines inclined thereto, depending upon whether a spur gear or a bevel gear is being cut. In the cutting of the bevel gear, the tools will converge, of course, as they move across the face of the blank, toward the blank apex. While the tools reciprocate across the face of the blank and as the blank rotates at a uniform velocity through the arc 40, the tools are translated through the distance 37—41 and simultaneously moved inwardly toward the blank axis the distance 42, the points of convergence of the sides of the tools moving thus from 37 to 37′ while the tooth rotates from 35 to 35′. For teeth of different profile shapes, the ratios of these motions may be varied and, in some cases, the inward feed motion may be omitted entirely. It is to be understood, also, that instead of rotating the blank at a uniform velocity and translating the tools at a varying velocity, these motions may be inverted and the blank rotated at a varying velocity while the tools are moved at a uniform velocity as it is always the relative velocity ratio which determines the profiles. It is to be further understood that both the rotary and translatory motions may be applied to the blank and the tools held stationary except for their reciprocating movements or whatever motion is employed to produce the lengthwise tooth shape. Likewise, the blank might be held stationary on its axis and the combined rotary and translatory movements imparted wholly to the tools.

We shall refer now to Figures 1 to 4 of the drawings wherein is illustrated one embodiment of a straight-tooth bevel-gear generator for cutting straight-tooth bevel gears according to this invention. 50 designates the base or frame of the machine. Upon this base at one end thereof is secured the upright or cradle housing 51. Upon the other end of the base is mounted the swinging base 52.

The cradle 54 is oscillatably mounted in the cradle housing 51, being journaled in the bearings 55 and 56 formed integral with the cradle housing. The cradle housing is formed with circular ways 58 of V-shaped cross section. The cradle 54 is formed with a face-plate 60 exteriorly of the cradle housing and this face-plate is provided with a guide-surface that engages the way 58. A circular gib 62 serves to hold the face-plate in engagement with the way 58. This gib is secured to the face-plate by screws 63.

Mounted on the face-plate 60 for angular adjustment thereon about the axis of the cradle are a pair of arms 64 and 65. These arms pivot about a stud 66 which is secured to the cradle by screws 67. They are adjusted angularly about this stud by the screw 68. They may be secured in any position of their angular adjustment by the bolts 69, which pass through arcuate slots 70 formed in the arms and thread into the face of the cradle, and by the cap member 72 which is secured to the stud 66 by the screws 73 and which serves to engage the arms.

The arms are provided with ways in which the tool slides 74 and 75 reciprocate. The cutting tools T and T′ are secured in tool blocks that are adjustably mounted upon clapper blocks which pivot upon tool heads 76 and 77 that are adjustably secured to the tool slides 74 and 75, respectively.

The tool slides 74 and 75 are connected by pins 78 with blocks that slide in a slot formed in the face of an oscillating plate 80. The plate 80 is driven from a motor (not shown) through the gear 82, the shaft 83, the bevel gearing 84 and 85, the shaft 86 which is journaled in the cradle coaxially thereof and the crank-plate 87 which is formed integral with the shaft 86. The face of the crank plate is formed with a slot 89 in which the block 90 is adjustable by means of the screw 91. This block carries the crank-pin 92. An arm 93 is pivotally mounted on this pin 92 and is connected by means of a pin 94 with an arm 95 that is keyed to the shaft 96. The actuating plate 80 is formed integral with the shaft 96. Through the mechanism described, the tool slides 74 and 75 are reciprocated simultaneously in opposite directions to cause the cutting tools T and T′ to take cuts alternately on the blank. The tool arms are adjusted so that the paths of movement of the tools converge, for instance, at the blank apex and the tools cut alternately on opposite sides of a tooth of the blank.

The tool mechanism and the drive to the same are identical with the tool mechanism and tool drive described in Patent No. 1,656,633 and reference may be had to that patent for a more detailed description thereof.

As in Patent No. 1,656,633, the generating roll is produced by simultaneous oscillation of the cradle and rotation of the work spindle. 100 designates a worm wheel segment. This is of the split type and its parts are secured together by bolts 101. 102 designates a worm which is mounted to mesh with the worm wheel segment 100 and drive the same. This worm 102 is formed integral with a shaft 103 which is driven, during cutting, in time with the blank rotation by the pair of bevel gears 104 and 105. This drive to the cradle worm 102 imparts rotation at a uniform velocity to the worm and may be through the same train of gearing as is employed in the machine of Patent No. 1,656,633. The machine illustrated in the drawings of the present application differs from the machine of Patent No. 1,656,633, as regards the cradle drive, in that there is provided means for super-imposing on the uniform rotational movement of the cradle worm 102 an additional movement at a varying velocity resulting from the combination of the uniform and varying motions of the worm. The means for imparting this motion at a varying velocity to the cradle worm will now be described.

The cradle worm bracket 110 is formed with an extension 111. Mounted in this extension for reciprocating movement therein is a sleeve member 112. The sleeve member 112 is connected to the worm shaft 103 so that as the sleeve member reciprocates, a reciprocatory movement is imparted to the worm shaft and to the worm 102 mounted thereon. To this end, the sleeve member 112 is formed with a shoulder 113 that engages the outer race of a set of ball bearings 114 in which the worm shaft 103 is journaled. There is a clamping disc 115 secured by screws 116 to the lower end of the sleeve 112 and this disc 115 when in position engages the opposite face of the outer race of the ball bearings 114. Thus the ball bearings 114 are clamped between the shoulder 113 of the sleeve 112 and the clamping disc 115 which is secured to the sleeve.

The ball bearings are themselves clamped between a spacer 118 mounted on the shaft 103 and a wide-faced pinion 120 which is keyed to the shaft 103. The pinion 120 is secured to the shaft 103 against axial movement relative thereto by means of the nut 121. The spacer 118 abuts against one end of the cradle worm 102 which, as described, is formed integral with the shaft 103.

The sleeve 112 is reciprocated at a varying velocity by a cam 125. This cam is keyed to a shaft 126 which extends transversely through the sleeve 112, passing through an elongated slot 127 formed in this sleeve. The cam 125 is mounted on a tapered portion of the shaft 126 and is secured against axial movement relative thereto by the nut 128. The shaft 126 is journaled in bearings 130 and 131, that are secured in the extension of the worm bracket 111, by screws 132 and 133, respectively.

135 designates a roller or follower which is in engagement with the cam 125. This roller is mounted with anti-friction bearings on a stud 136 which is secured in the sleeve 112. This stud 136 may be mounted, as shown, at one end in a cap member 137 which serves to secure in place the anti-friction bearings on which the roller 135 is mounted.

140 designates a stud which threads into the upper end of the sleeve 112 and passes through an opening in a cap member 142 which is secured to a bearing bracket 143 by screws 144. The bearing bracket 143 is secured to the extension 111 of the worm bracket 110 by screws 145. The bearing bracket is provided with a guide portion in which the upper end of the sleeve 112 has its bearing and slides.

147 designates a coil spring which surrounds the stud 140 and which is housed in the cap member 142. This spring serves to hold the roller 135 in engagement with the cam 125. The roller can be disengaged from the cam by threading up a nut on the outer end of the stud 140.

The cam 125 is rotated from the worm shaft 103 to reciprocate the sleeve 112. Journaled in the extension 111 of the worm bracket is a shaft 150. This shaft 150 carries at its lower end a spur gear 151 that meshes with the wide-faced spur pinion 120. At its upper end, the shaft 150 carries a bevel pinion 152 that meshes with and drives a bevel gear 153 (see also Figure 4). The bevel gear 153 is keyed to a stub shaft 154 and to this shaft is keyed one part 155 of a face-clutch. The other part 156 of this clutch is rotatable on the shaft 154. One change gear 158 of a set of spur change gears is keyed to the clutch part 156. The shaft 154 is formed with a squared end so that the shaft and through it the cradle can be adjusted when the clutch parts 155 and 156 are disengaged. The clutch parts are held in engagement during the operation of the machine by the nut 159 and washer 160. A spring 161 interposed between the parts 155 and 156 serves to disengage them when the nut 159 is released. The change gear 158 drives the cam shaft 126 through an idler 165 and the gear 166, the latter being keyed to the shaft 126.

Through the mechanism described, it will be seen that rotation at a varying velocity is imparted to the cradle, the variation in movement depending upon the contour of the cam 125. For different jobs, cams of different contours will be used. The cam 125 causes the worm shaft 103 to be reciprocated and the motion imparted to the cradle by this movement of the worm 102 corresponds to that of a rack of the pitch of the worm meshing with a spur gear of the pitch of the worm wheel 100. This motion is combined with the uniform motion imparted to the worm shaft 103 by the gears 105 and 104. Thus the worm 102 acts to impart to the cradle two combined motions. The worm shaft 103 has a splined connection with the bevel gear 104 to allow of reciprocation of the worm shaft through action of the cam 125 while at the same time it is being rotated through action of the bevel gears 105 and 104. The wide-faced pinion 120 insures that the drive to the cam 125 will be continuous regardless of the position of the worm shaft 103 in its reciprocatory movement.

In the machine of Patent No. 1,656,633, the work head is mounted upon a sliding base which is movable in a direction perpendicular to the plane of operation of the cutting tools. In a machine built according to the present preferred embodiment for practising the present invention, it is preferred to substitute for the sliding base, a swinging base, such as is ordinarily employed on present type Gleason spiral bevel gear generators. Such a swinging base is shown, for instance, in Patent No. 1,686,522 issued October 9, 1928.

The work spindle 170 (Fig. 1) is journaled in a head 171 that is adjustable angularly on the swinging base 52 so that the work head can be adjusted in accordance with the pitch cone angle of the gear blank G to be cut. The gear blank G is secured to the work spindle.

The swinging base 52 is oscillatable about an axis perpendicular to the axis of the cradle 54 to feed the gear blank into depth and to withdraw it periodically away from the tools, when a tooth has been generated and the blank is to be indexed. For the purpose of this alternate feed and withdrawal motion, a cam such as ordinarily employed in Gleason spiral bevel gear generators may be used, but if the curvature of the profile of the gear teeth to be generated is such that the center distance or angle between the work spindle and the tools must be changed during generation, then a special type cam must be used. The contour of the track-way of this cam will be formed to produce the desired change in center distance during the roll as indicated by the curve 26 in Figure 5. This cam may be simply substituted for the ordinary feed cam and mounted as shown in the drawings upon the feed-cam shaft 176 which may be driven through any suitable means such as are ordinarily employed in bevel gear generators. The cam 175 operates to oscillate the swinging base through a roller 177 that engages in the track-way of the cam 175 and is connected to the swinging base. In the drawings we have shown in full and dotted lines two different positions of the blank and swinging base during the generating roll.

In the operation of a machine constructed as described, the tools will be continuously reciprocated through the mechanism described. The blank is fed into depth by an inward swing of the swinging base 52 under actuation of the cam 175. As the tools reciprocate across the face of the blank they cut opposite sides of a tooth of the blank. The blank rotates on its axis during the cut and simultaneously the cradle is rotated on its axis. The rotation of the blank is at a uniform velocity being derived from the bevel gear 180 and 181, the shaft 182, the bevel gearing 183 and 184 and the train which connects this gearing with the index worm wheel (not shown) but housed in the index housing 185 and secured to the work spindle 170. This drive may be the same as ordinarily employed in bevel gear generators. The bevel gear 180 is rotated in time with the bevel gear 105 which imparts a uniform rotation to the cradle worm shaft 103. The cradle rotation during the cutting of the tooth sides is at a varying velocity resulting from the combination of the uniform rotational movement imparted to the worm shaft by the bevel gearing 105 and 104 and the reciprocation of this shaft at a varying velocity as produced by the rotation of the cam 125. When the tooth profiles to be generated require it, the swinging base is oscillated about the gear 180 during the generating roll to thereby change during generation the center distance or angle between the axis of the work spindle and the plane of cut.

The tools may cut only during the roll of the cradle in one direction and be then withdrawn or they may be set in relative to the work at the end of the roll in one direction and take a final finishing cut on the return roll of the cradle. In either case, when the tooth has been completely generated, the work is swung away from the tools by operation of the cam 175 far enough to clear the tools and the work is indexed. When the blank has been indexed, it is again fed into depth and a new tooth of the blank is generated.

The mechanisms for controlling the indexing of the blank and the reversal of cradle and work spindle movements, may be of any suitable type such as are ordinarily employed in bevel gear generating machines. They form no part of the present invention and have, therefore, not been specifically described herein.

While a particular embodiment of the invention has been described, it is to be understood that the invention is capable of various further modifications, adaptations and uses and that this application is intended to cover any adaptations, uses or embodiment of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. In a machine for producing gears, a rotatable work spindle, a tool mechanism, a cradle upon which one of said parts is mounted and which is oscillatable about an axis inclined to the axis of the work spindle, said tool mechanism comprising a pair of reciprocable tools adjustable to cut opposite sides of a tooth, means for reciprocating said tools, means for rotating the cradle and work spindle on their respective axes at a uniform relative velocity, a second means for producing an additional rotation of one of said rotatable parts about its axis at a varying velocity and means for periodically indexing the work spindle.

2. The method of generating the tooth profiles of a gear which comprises imparting a cutting motion to the tool and rotating the blank on its axis at a uniform velocity, while producing a relative movement of translation between the tool and blank at a varying velocity and simultaneously varying the distance between the axis of the blank and the plane of cut.

3. The method of generating the tooth profiles of a tapered gear which comprises reciprocating a tool across the face of a tapered gear blank, while rotating the blank on its axis at a uniform velocity, producing a relative movement at a varying velocity between the tool and blank about an axis inclined to the blank axis, and simultaneously varying the angle between the blank axis and the plane of cut.

4. In a machine for producing gears, a work spindle, a tool mechanism, an oscillatory cradle upon which one of said parts is mounted, said tool mechanism comprising a pair of reciprocating tools, means for reciprocating the tools, means for rotating the work spindle at a uniform velocity, means for oscillating the cradle at a uniform velocity, means for simultaneously moving the tools at a varying velocity about the axis of the cradle, and means for periodically indexing the work spindle.

5. In a machine for producing gears, a work support, a tool support, a work spindle journaled in the work support, tool mechanism mounted on the tool support, an oscillatory cradle upon which one of said supports is mounted, means for actuating the tool mechanism, means for rotating the work spindle at a uniform velocity, means for oscillating the cradle at a varying velocity, and means for periodically indexing the work spindle.

6. In a machine for producing gears, a work support, a work spindle journaled in the work support, a tool support, a tool mechanism mounted on the tool support, means for actuating the tool mechanism, means for rotating the work spindle and simultaneously imparting a relative movement of translation between the tool mechanism and the work support, one of said two latter motions being at a varying velocity, means for varying the distance between the tool mechanism and the work support during operation of the tool mechanism on the tooth profiles, and means for periodically indexing the work spindle.

7. In a machine for producing tapered gears, a work support, a work spindle journaled in the work support, a tool support, tool mechanism mounted on the tool support, an oscillatory cradle upon which one of said supports is mounted, means for actuating the tool mechanism, means for rotating the work spindle at a uniform velocity, means for oscillating the cradle at a varying velocity, means for swinging the work support toward or from the tool mechanism during the operation of the tool mechanism on a tooth profile, and means for periodically indexing the work spindle.

8. In a machine for producing gears, a work support, a work spindle journaled in the work support, a tool support, tool mechanism mounted on the tool support, a cradle upon which one of said supports is mounted, means for rotating the work spindle at a uniform velocity, means for actuating the cradle at a uniform velocity in time with the work spindle rotation comprising a worm and worm wheel, and means for simultaneously moving the worm axially at a varying velocity to vary the timed relation of the work spindle and cradle motions as the tool mechanism rolls over the tooth profiles whereby to generate tooth profiles of other than involute shape on the gear teeth.

9. In a machine for producing gears, a work support, a work spindle journaled in the work support, a tool support, tool mechanism mounted on the tool support, means for actuating the tool mechanism, an oscillatory cradle upon which one of said supports is mounted, means for rotating the work spindle at a uniform velocity, means for actuating the cradle in time with the work spindle rotation comprising a worm wheel secured to the cradle, a worm driving said wheel, means for rotating said worm, and means for moving said worm axially, said last named means comprising a rotary cam and a follower engaged therewith, and means driven from the worm shaft for rotating said cam, and means for periodically indexing the work spindle.

10. The method of producing a tapered gear which comprises generating its tooth profiles by reciprocating a tool across the face of a tapered gear blank while rotating the blank on its axis at a uniform velocity, producing a relative swinging movement at a uniform velocity between the tool and blank about an axis angularly disposed to the axis of the blank, simultaneously moving the tool mechanism about the same axis at a varying velocity, and varying the angle between the blank axis and the plane of cut during operation of the tool, and periodically indexing the blank.

11. The method of generating a gear which comprises reciprocating a tool across the face of a gear blank while rotating the blank on its axis at a uniform velocity, producing a relative movement of translation between the tool and blank at a uniform velocity, simultaneously moving the tool in the direction of said translation at a varying velocity and simultaneously varying the distance between the blank axis and the plane of cut and periodically indexing the blank.

12. In a machine for producing gears, a work support, a work spindle journaled in the work support, a tool support, a reciprocatory tool mounted on the tool support, means for reciprocating the tool, means for rotating the work spindle at a uniform velocity, means for producing a relative movement of translation between the work spindle and the tool support at a uniform velocity, means for simultaneously moving the tool in the direction of said translation at a varying velocity and means for periodically indexing the work spindle.

13. In a machine for producing gears, a work support, a work spindle journaled in the work support, a tool support, a reciprocatory tool mounted upon the tool support, means for reciprocating the tool, means for rotating the work spindle at a uniform velocity, means for producing a relative movement of translation between the work spindle and the tool mechanism at a uniform velocity, means for simultaneously moving the tool in the direction of said translation at a varying velocity, means for varying the distance between the axis of the work spindle and the plane of cut during cutting, and means for periodically indexing the work spindle.

14. The method of generating a gear which comprises operating a tool having a side cutting edge in engagement with a gear blank and, while producing a relative rolling movement between the tool and blank, imparting a relative sidewise movement to the tool at a varying velocity in the surface of the rolling movement as the tool rolls along the tooth profiles of the blank.

15. The method of generating a gear which comprises operating a tool having a side cutting edge in engagement with a gear blank and, while producing a relative rolling movement between the tool and blank, imparting a relative sidewise movement to the tool at a varying velocity in the surface of the rolling movement and simultaneously varying the distance between the axis of the blank and the plane of cut as the tool rolls along the tooth profiles.

16. The method of generating a gear which comprises operating a tool in engagement with a gear blank and producing a relative rolling movement between the tool and blank and varying the velocity of the rolling motion and the distance between the blank axis and the plane of cut as the tool rolls over the tooth profiles of the blank.

17. The method of generating a gear which comprises operating a tool in engagement with a gear blank, rotating the blank on its axis and simultaneously producing a relative movement between the tool and blank about an axis angularly disposed to the axis of the blank and representing the axis of a basic generating gear and moving said tool angularly about the last-named axis at a varying velocity and simultaneously varying the distance between the blank axis and the plane of cut as the tool rolls along the tooth profiles of the blank.

18. In a machine for generating gears, a work spindle, tool mechanism, means for producing a relative rolling movement between the work spindle and the tool mechanism, and means for imparting a relative sidewise movement to the tool mechanism at a varying velocity in the surface of the relative rolling movement as the tool mechanism rolls along the tooth profiles of the blank.

19. In a machine for generating gears, a work spindle, tool mechanism, means for producing a relative rolling movement between the tool mechanism and work spindle, and means for imparting a relative sidewise movement to the tool mechanism at a varying velocity in the surface of the relative rolling movement as the tool mechanism rolls along the tooth profiles of the blank and means for simultaneously varying the distance between the axis of the work spindle and the plane of cut during said roll.

20. In a machine for generating gears, a work spindle, tool mechanism, means for producing a relative rolling movement between the tool mechanism and work spindle and means for varying the velocity of the rolling movement as the tool mechanism rolls along the tooth profiles of the blank.

21. In a machine for generating gears, a work spindle, tool mechanism, means for producing a relative rolling movement between the tool mechanism and work spindle and for varying the velocity of the rolling movement as the tool mechanism rolls along the tooth profiles of the blank, and means for simultaneously varying the distance between the axis of the work spindle and the plane of cut during said rolling movement.

22. In a machine for generating gears, a work spindle, tool mechanism, a cradle upon which one of said parts is mounted, means for rotating the work spindle on its axis at a uniform velocity, means for rotating the cradle on its axis at a uniform velocity, and means for moving the tool mechanism about the cradle axis at a varying velocity as the tool mechanism rolls along the tooth profiles of the blank.

23. In a machine for generating gears, a work spindle, tool mechanism, a cradle upon which one of said parts is mounted, means for rotating the work spindle on its axis at a uniform velocity, means for rotating the cradle on its axis at a uniform velocity, means for moving the tool mechanism about the cradle axis at a varying velocity as the tool mechanism rolls along the tooth profiles of the blank, and means for simultaneously varying the distance between the axis of the work spindle and the plane of cut during said rolling movement.

ALLAN H. CANDEE.
LEONARD O. CARLSEN.